United States Patent [19]
Koch

[11] Patent Number: 5,530,725
[45] Date of Patent: Jun. 25, 1996

[54] DIVERSITY RECEIVER FOR DISPERSIVE CHANNELS, COMBINING RELIABILITY-WEIGHED SIGNALS

[75] Inventor: Wolfgang Koch, Heroldsberg, Germany

[73] Assignee: U.S. Philips Corporation, New York, N.Y.

[21] Appl. No.: 386,714

[22] Filed: Feb. 9, 1995

Related U.S. Application Data

[63] Continuation of Ser. No. 707,524, May 30, 1991, abandoned.

[30] Foreign Application Priority Data

Jun. 6, 1990 [DE] Germany .......................... 40 18 044.1

[51] Int. Cl.⁶ ...................................................... H04L 1/02
[52] U.S. Cl. ........................... 375/347; 455/137; 375/229
[58] Field of Search ..................................... 375/267, 347, 375/350, 232, 235, 229, 260; 455/132, 137; 371/6

[56]  References Cited

U.S. PATENT DOCUMENTS

| | | | |
|---|---|---|---|
| 3,879,664 | 4/1975 | Monsen | 375/100 X |
| 4,271,525 | 6/1981 | Watanabe | 375/100 |
| 4,328,582 | 5/1982 | Battail et al. | 371/37 |
| 4,606,047 | 8/1986 | Wilkinson | 371/36 |
| 5,119,400 | 6/1992 | Koch | 375/12 |
| 5,127,025 | 6/1992 | Okanoue | 375/100 |

*Primary Examiner*—Stephen Chin
*Assistant Examiner*—Tesfaldet Bocure
*Attorney, Agent, or Firm*—Michael E. Schmitt

[57]  ABSTRACT

At least two receiving branches receive incoming signals corresponding to a transmitted data sequence. Each branch includes an equalizer for producing an estimate of the transmitted data sequence, and providing for each data element a reliability information signal representing a computed probability that the data symbol or value for that element is correct. The receiver selects as a most probable estimate the symbol or value having the highest sum of the reliability information signals from the receive branches. Preferably, for a binary system, each branch provides a single numerical value whose sign identifies the symbol (e.g., 1 or 0), and whose absolute value is its probability. The single numerical values from the branches are simply added to determine the best estimate for that element.

4 Claims, 3 Drawing Sheets

DIVERSITY RECEIVER FOR DISPERSIVE CHANNELS, COMBINING RELIABILITY-WEIGHED SIGNALS

This is a continuation of application Ser. No. 07/707,524, filed May 30, 1991, now abandoned.

BACKGROUND OF THE INVENTION

The invention relates to a receiver comprising at least two receive branches for receiving an incoming signal corresponding to a transmitted data sequence, in which the resulting signals of each receive branch are combined in accordance with their receive quality.

Receivers comprising at least two receive branches, each receive branch receiving signals that have equal signal contents, are denoted as diversity receivers. In so-called space-diversity arrangements the aerials of each receive branch are arranged several wavelengths apart. In so-called frequency-diversity arrangements the signals are transmitted and received at different frequencies. Since the transmission requirements are different for each transmission path or each position with respect to frequency, the signals are received with different qualities in the separate receive branches. With a sufficiently large distance between the aerials in a space-diversity arrangement or with a sufficiently large distance with respect to the frequency of the signals in a frequency-diversity arrangement, the receive qualities of the individual signals in the receive branches are even statistically independent of each other. Therefore, by properly processing the signals received in the separate receive branches, it is possible to obtain a received signal that has better properties (e.g. in respect of signal-to-noise ratio) than any of the separately received signals.

In "Microwave Mobile Communications" by William C. Jakes Jr. the concept of maximal ratio combining denotes a processing option of the received signals of a diversity receiver, in which each received signal is weighted in accordance with the useful signal-to-noise signal ratio and the weighted signals are added together to form a single signal.

With maximal ratio combining as far as this is known for analog signals, the phase conditions of the analog signals are to be adapted to each other before the signals are added together. If, on the other hand, the received signals are based on data signals having so large a data rate that intersymbol interference occurs caused by the dispersive channel, the adding together of the separately received signals generally leads to a deterioration of the total signal.

SUMMARY OF THE INVENTION

Therefore, it is an object of the present invention to provide in a most simple manner a diversity receiver of the type defined in the opening paragraph, so that it is suitable for processing data signals which present intersymbol interference.

This object is achieved in that each receive branch comprises an equalizer which produces for each detected one-bit data element a reliability information signal and in that the transmitted data sequence is estimated on the basis of the reliability information associated with the detected data elements of the individual receive branches.

The equalizer arranged in each receive branch detects data elements contained in the separately received signals. The detected data elements can then be compared to each other in time by means of the synchronizing method. Consequently, it is possible to perform not only a summation of the data elements in a correct phase relation but also a summation of the fight data elements. The reliability information assigned to individual data symbols denotes with what probability the equalizer has estimated for a specific data symbol in a data element. A proper combination of the data symbols detected by different receive branches for one data element makes it possible, when the associated reliability information signals are taken into account, to determine a data symbol estimate whose reliability is higher than the reliability of the corresponding data symbol estimate in each separate receive branch. Compared to other methods according to which a pure majority decision or a combination weighted by means of a quality estimation performed over several data bits (elements) (e.g. useful signal-to-noise signal ratio) is implemented, the combination based on instantaneous quality estimation presents the advantage of obtaining a further improvement of the error rate.

The invention is based on the consideration that for deciding on a data symbol, an estimated data symbol which is anticipated to have a high reliability is to have a distinctly higher weight than one or a plurality of other estimated data symbols which are anticipated as less likely to be correct. Alternatively, it should also be possible for a plurality of said estimated data symbols having average reliability values to have a combined reliability exceeding that of a different data symbol having a good reliability value. Thus, the decision in favour of a data symbol is, in essence, determined by the receive branches having the better receive quality.

Based on the statistically independent variations of the noise signals in the different receive branches the instantaneous noise amplitudes for a same signal bit (element) are generally different. Since the quality of the combination is primarily determined by the branch having a currently higher reliability, a quality improvement can be obtained even when the field strengths at the receive aerials as well as the power levels of the noise produced in the receive input stages are identical.

In data transmission systems, in which the transmitted digital data are binary values (for example, 0 and 1), the equalizers can advantageously be devised in such a way that, for representing the data symbol (0 or 1) detected estimated for each data element and for representing the reliability information assigned to this estimate, only a single numerical value is provided. The sign of the numerical value identifies the data symbol detected for each data element and the absolute value forms the reliability information assigned to this data element. The absolute value is also denoted as a reliability coefficient in the following. Preferably, the numerical value $a(b_i)$ for an estimated bit i is $$q(b_i) = C(b_i) \cdot \ln \frac{1 - P(b_i)}{P(b_i)}$$

where $P(b_i)$ represents the current bit error probability in the $i^{th}$ bit interval and the factor $C(b_i)$, in accordance with the binary value of the estimated binary data symbol, may assume the value +1 (for example, for the binary value 1) or −1 (for example, for the binary value 0).

The combination of binary value and reliability information in this form presents the advantage that for determining the estimate for the data symbol forming data element, the numerical values determined for that data element estimate in the separate receive branches are only to be added together. The the sum resulting from this addition of these numerical values immediately provides the binary value of this data element without any further calculation. In the case where for a further processing a reliability information signal or a reliability coefficient is necessary for this estimate, it is the absolute value of this sum that can be normalized as required in accordance with the number of receive branches used. This embodiment is advantageous in that an estimate is obtained with the smallest circuitry and the least expenditure.

The invention will be further described and explained with reference to an exemplary embodiment represented in the drawing.

DESCRIPTION OF THE PREFERRED EMBODIMENT

Figure 1:
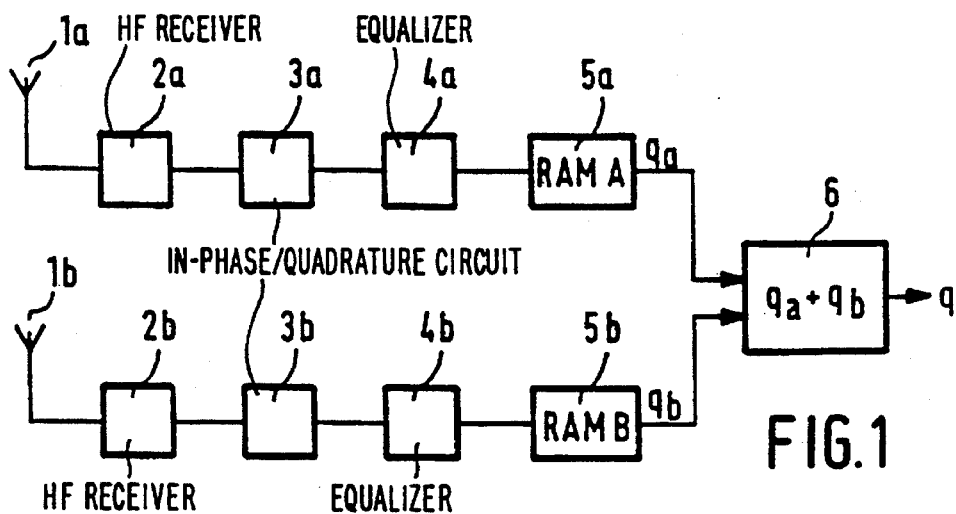
FIG. 1 shows a receiver comprising two receive branches.

FIG. 1 shows a binary data receiver which has two separate aerial inputs for incoming signals and two separate receive branches having the same structure. Each receive branch comprises a HF receive section $2a$, $2b$, an arrangement for producing normal and quadrature components in the baseband region $3a$, $3b$ and an equalizer $4a$, $4b$.

The equalizers $4a$, $4b$ are devised in such a way that they produce a reliability information signal with each detected data symbol forming a data element in addition to each detected data symbol. This reliability information denotes with what probability the equalizer has decided each detected data symbol. An equalizer having such properties will be described in the following.

Figure 2:
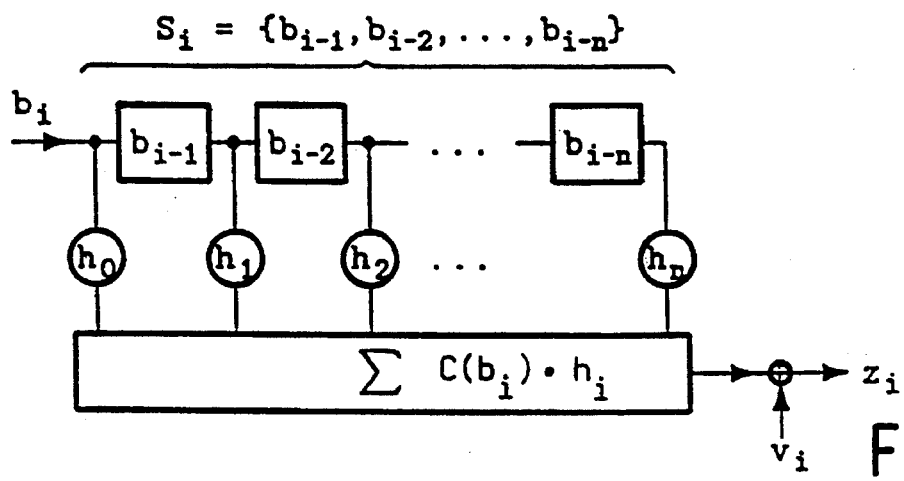
FIG. 2 shows a channel model of a dispersive transmit channel.

The equalization of a received signal $r(t)$ is based on a channel model which approximately describes the dispersive transmit channel through a linear finite transversal filter. FIG. 2 represents such a channel model in which the transmission features of the transmit channel are modeled by the filter coefficients $h_0 \ldots h_n$. During the transmission of a binary element $b_i$ and the n binary elements $b_{i-1} \ldots b_{i-n}$ preceding this binary element $b_i$, the linear combination of $C(b_i)*h_0+C(b_{i-1})+\ldots C(b_{i-n})*h_n$ is formed and additionally superimposed by a noise signal $v_i$.

Figure 6:
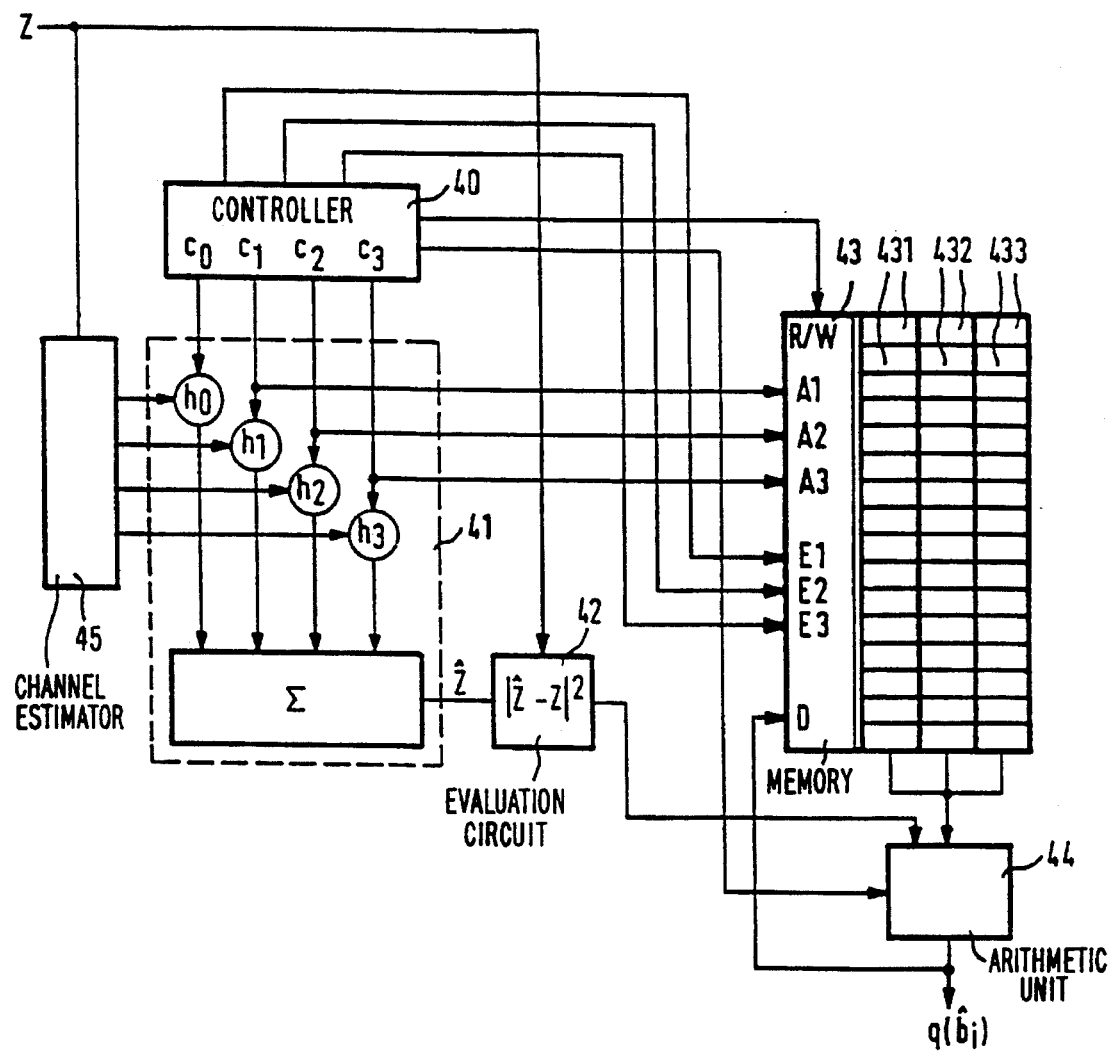
FIG. 6 is a diagrammatic representation of the equalizer/detector.

In the receiver attempts are made using this specific channel model, to imitate the distortions occurring on the transmit path by means of the linear combinations comprising a memory and by means of a transversal filter 41 shown in FIG. 6. The imitation of the transmit path is obtained by accordingly adjusting the filter coefficients $h_0, h_1, \ldots h_n$. The filter coefficients $h_0, h_1, \ldots, h_n$ may be derived from the sample values of an estimated impulse response of the transmit channel. For example, a so-called training sequence which is known both to transmitter and receiver and consists of a bit string may be used for this purpose. With each reception of a training sequence portion of an incoming signals the filter coefficients $h_0, h_1, \ldots h_n$ are adjusted in such a way that the output signal corresponds in the best possible way to the relevant part of the input signal. This procedure is generally denoted as channel estimation and described, for example, in the article by A. Bayer,: "Correlative and iterative channel estimation in adaptive Viterbi equalizers for TDMA mobile radio systems", ITC Technical Report 109 for the "Stochastische Modelle und Methoden in der Informationstechnik" symposium, April 1989, published in VDE Technical Report 107, VDE Verlag, Berlin, pp. 363 to 368. Further references as to the literature can be found there. For example, a channel estimator arranged in this manner is referenced 45 in the exemplary embodiment.

For equalization and detection purposes the so-called Viterbi method is often used. The equalizer/detector described in this context is also based on this method.

Figure 3:
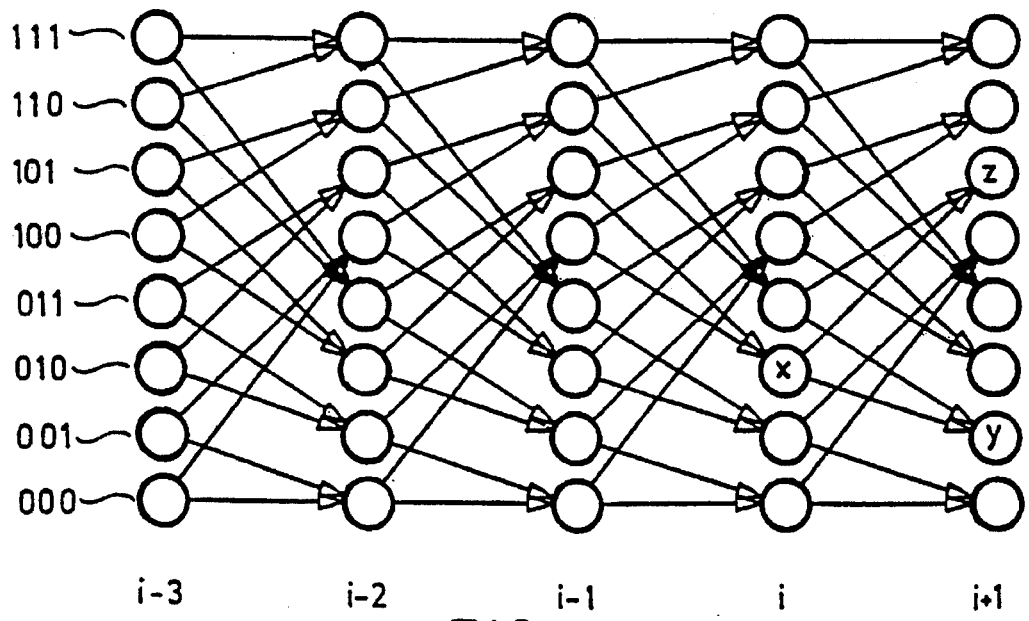
FIG. 3 shows a state diagram for the equalizer/detector used.

To represent the implemented method, a state diagram will be used hereinafter with reference to which usually also the Viterbi method is described. The state diagram is a graph depicting in vertical direction lines of $2^n$ nodes. FIG. 3 shows by way of example such a graph for n=3. Each node represents one of the combinations that can be made from n binary elements. n is in this case the number of binary elements preceding a binary element that has just been received, whose influence on the binary element to be estimated is to be taken into consideration for the equalization n; corresponds to the number of binary elements of the channel model as shown in FIG. 2. Each combination of these binary elements will be denoted as a state hereinafter. In the state diagram a plurality of these lines are arranged in horizontal direction. Each column is allocated to a specific sample instant i−3, i−2, i−1, i, i+1. The individual binary values (in FIG. 3, 000, . . . , 111) which can be assigned to a node are denoted as its state. A state always corresponds to a possible allocation of n most recently received digital sample values at an instant i to a transmitted bit string.

In the state diagram always the same state is assigned to each node depicted in horizontal direction, while the bit strings allocated to these states are shown on the left. The first, i.e. the leftmost binary value of a state corresponds to the binary value assigned to the most recently received sample value, the next binary value to the assignment to the sample value preceding this sample value and so forth. Thus, at instant i the first binary value corresponds to the estimate $\hat{b}_i$ and the last binary value to the estimate $\hat{b}_{i-n}$.

When a new sample value $z_i$ is received, both the binary value 0 and the binary value 1 can be assigned thereto. For example, as a result of the fact that the binary value 0 is assigned to the most recent sample value, the bit string 010 becomes the string 0010 or as a result of the fact that a binary value 1 is assigned to the most recent sample value, the string becomes 1010, which string 0010 or 1010 can be assigned to the transition to the next state. In this manner one comes from state 010 to state 001 or 101. As a result of the fact that a binary value 0 or 1 is assigned to the sample value there are always only two transitions from each state to a state in each state column to its right.

The state diagram shown in FIG. 3 features by way of arrows any transition possible in this manner. For example, the two arrows from node x, whose state is assigned the bit string 010 at instant i, show, on the one hand, a zero-transition to the node y, which is assigned the state 001 at instant i+1 and, on the other hand, a one-transition to the node z, which is assigned the state 101 at instant i+1.

For each transition from one node to the next node the probability with which this transition takes place is computed. Combinations of linked transitions between nodes of adjacent node columns provide a path. This path is equivalent to the reconstructed bit string $\hat{b}_i, \hat{b}_{i-1}, \ldots \hat{b}_{i-n}$. A multiplicative combination of probabilities of the individual transitions in a path produces the overall probability of the path.

For computing the transition probability from one state to another state the individual binary values of the binary elements $b_i \ldots b_{i-n}$ of a state are used as input parameters $c_1 \ldots c_n$ of the transversal filter. The first input parameter $c_0$ always corresponds to the binary value of the transition, thus to the binary value assigned to the sample value just received. The output value of the transversal filter produces in a first approximation and, while discarding disturbances as a result of noise signals $v_i$ etc. contained in the input signal, the value to be assumed by the sample value when the bit string $b_i, b_{i-1} \ldots b_{i-n}$ used as an input parameter is sent over the path model path and received. When comparing the output value $\hat{z}_i$ to the actual sample value $z_i$ the bit string sent most probably may thus be found.

A large transition probability from one state to a state following in time does certainly not sufficiently guarantee that this transition is correct. As a result of brief disturbances or signal noise a state transition that has actually not taken place may seem the most probable transition. Rather correct estimates of the state transitions and thus the estimate of the binary value of the digital sample value just received are achieved when the overall signal course that has taken place thus far is taken into consideration in the form of a calculus of probability of all the state transitions that lead to one of the $2^n$ states of the instant concerned. For this purpose, an overall coefficient may be assigned to each state, which coefficient, as with the formation of a connection probability, is formed by a multiplicative combination of all the individual coefficients of the transitions that have led to this state.

So-called metrics instead of coefficients are known to be used for this purpose. The metric may then be calculated from the negative logarithm of each coefficient. This is advantageous in that only the metrics are to be added together when a link probability is to be computed for which the individual coefficients are to be multiplied. For producing the metric in the exemplary embodiment the output value $\hat{z}_i$ of the transversal filter 41 is subtracted from the digital sample value $z_i$ in a signal evaluation circuit 42 and squared. In this manner a squared distance is formed. When assuming Gaussian white noise at the receiver input as the single noise source, this squared distance corresponds to the negative logarithm of the probability of a state transition. Without much loss of accuracy this squared distance is normally also used when the noise signal is not Gaussian white noise. In this case the metric is only an approximate of the negative logarithm of the probability of a state transition. The smaller the squared distance the larger the probability that the received sample value has emerged from the bit string used as an input parameter.

Due to the linear combination of the n last binary elements it is possible to form an optimal estimate only after all n binary elements have been received. Therefore, the estimate $\hat{b}_{i-n}$ is formed after the sample value $z_i$ has been received.

The estimate $\hat{b}_i$ assigned to the sample value $z_i$ is assigned in time to the transitions from the states at instant i to the states at instant i+1.

For forming the estimate $\hat{b}_{i-n}$ first all transition probabilities from all states i to the next states i+1 are computed in a first step, in which next states the binary value 0 was assigned to the transition of the binary element $\hat{b}_{i-n}$. The overall metric of the new states to be obtained in this manner is temporarily computed from the overall metric of the relevant preceding state L at the instant i and from the metric of the transition from this preceding state to the next state at the instant i+1.

Figure 4:
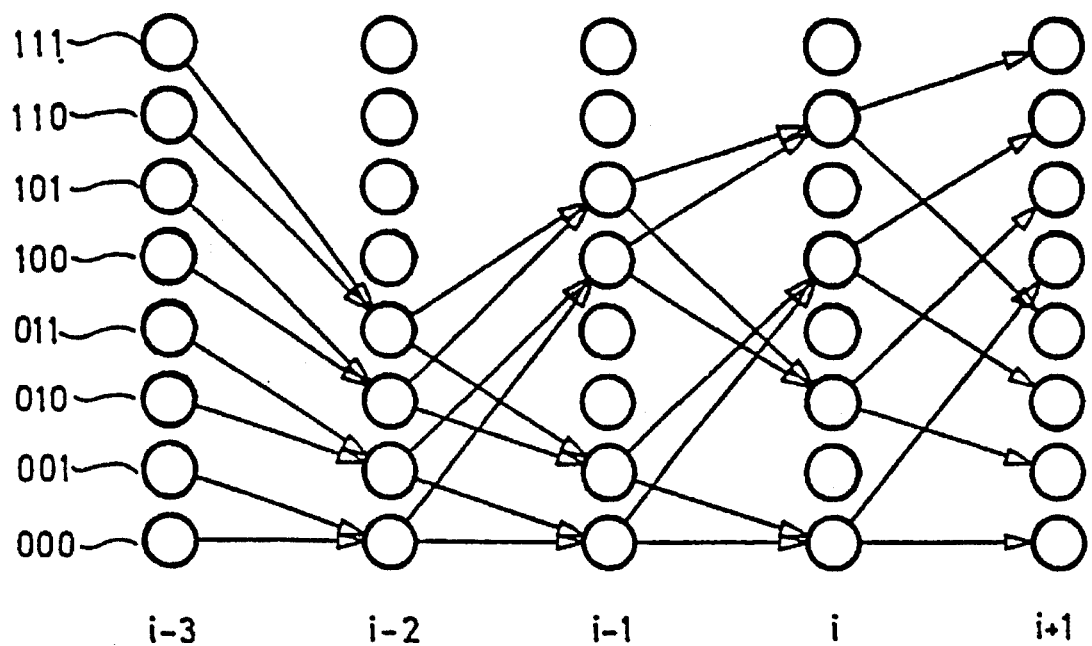
FIG. 4 shows a state diagram with all paths for $h_{i-n}=0$.
Figure 5:
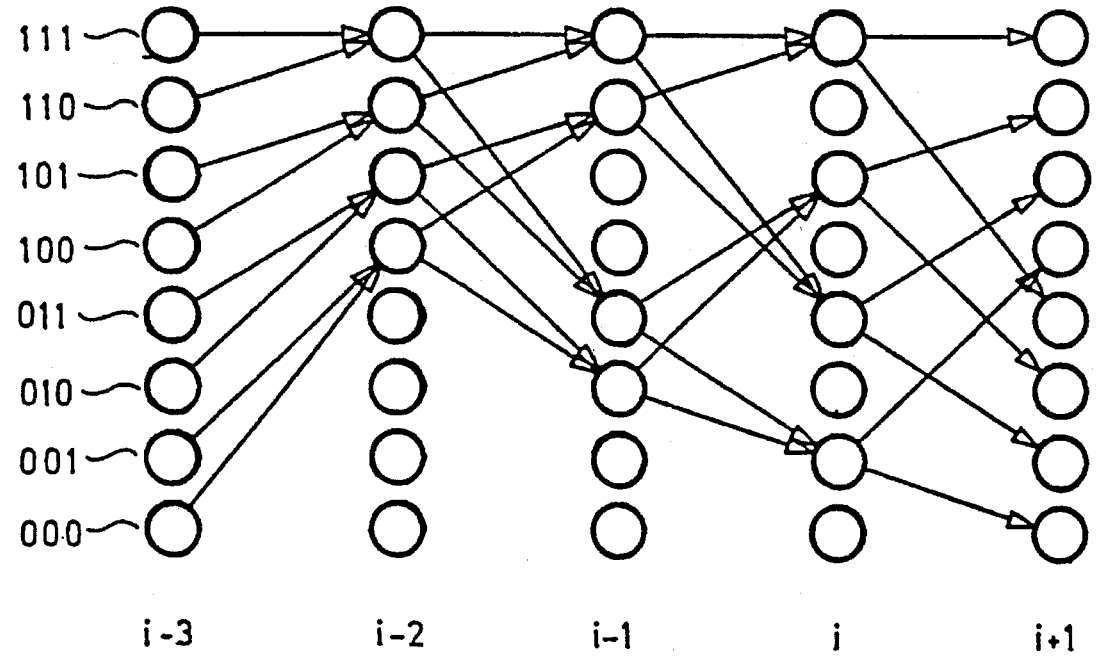
FIG. 5 shows a state diagram with all paths for $b_{i-n}=1$.

In a second step the overall metric of the states at instant i+1, in which the binary elements $\hat{b}_{i-n}$ corresponded to a binary value 1, is computed in similar fashion and thus a one-transition is effected. FIG. 4 represents the state diagram shown in FIG. 3 depicting only all the paths for which all the transitions from the instant i−1=i−3 to the instant i+1−n=i−2 were zero-transitions i.e. all the transitions at which the binary value 0 was assigned to binary element $\hat{b}_{i-3}$. On the other hand, FIG. 5 is a state diagram depicting only the paths in which for the transitions from instant i−3 to instant i−2 the binary value 1 was assigned to the binary element $\hat{b}_{i-3}$.

The smallest overall metric is computed on the basis of the overall metrics of all the states that have resulted from a zero-transition and on the basis of the overall coefficients of all the states that have resulted from a one-transition. This is to say, that the path having the smallest overall metric is selected from the sub-state diagram of FIG. 4 and the sub-state diagram of FIG. 5. These two paths will be denoted hereinafter as a zero-minimum path or as a one-minimum path respectively, and the overall metrics assigned to these paths will be denoted as a zero-minimum overall metric and as a one-minimum overall metric respectively.

The transition starting from instant i-n, which is assigned to the smaller of these two selected minimum overall metrics, then provides the estimate $\hat{b}_{i-n}$ for the binary element $b_{i-n}$ sent at instant i-n.

Each of these two selected minimum overall metrics represents the probability with which each selected path represented by the state of each selected node in the most favourable conditions can be assigned to the estimate $\hat{b}_{i-n}=0$ or the estimate $\hat{b}_{i-n}=1$. These probability values can be computed back from the overall metrics. In the case of coefficients the individual coefficients are to be divided to obtain reliability information that denotes by how many times the selected estimate is more probable than its complement.

The use of metrics simplifies this computation. By subtracting the zero-minimum overall metric from the one-minimum overall metric one obtains a numerical value whose sign indicates the more probable one of the two estimates. A positive sign then indicates that the binary value 1 as an estimate is more probable than the binary value 0. On the other hand, the absolute amount of this value forms the reliability coefficient $q(\hat{b}_{i-n})$.

In a last step the two newly formed overall coefficients pertaining to a specific state are compared to each other for each state and the smaller of the two values is assigned as a new overall coefficient to the state in question.

For implementing this method the embodiment comprises memory locations in a memory module 43, which are arranged in three columns of $2^n$ memory locations each. These columns are referenced first, second or third memory location column 431, 432, 433. The address $A_n \ldots, A_1$ of a memory location each time corresponds to one of the $2^n$ states. The address of a memory location contains in the first memory location column 431 the overall metric L assigned to a state. The second column 432 contains the overall metric $L_0$ obtained when a binary zero is assigned to the sample value just received and the third column of memory locations the overall metric $L_1$ obtained when a binary one is assigned to the sample value just received. A selection from each column 431, 432, 433 is effected by means of control signals from a controller 40. The control signals are led to appropriate enable inputs E1, E2 and E3 of the memory module 43. When a memory location is to be driven, the controller 40 simultaneously applies its address $A_n \ldots A_1$ as an input parameter $c_1 \ldots c_n$ to the transversal filter 41.

The controller gives the first input parameter $c_0$ as a binary value 0 for each address formed. In an evaluation circuit 42 the squared distance $1=(\hat{z}_i-z_i)^2$ is formed from the value $\hat{z}_i$ obtained in this manner from the transversal filter 41 and the sample value $z_i$. From this squared distance 1 and the overall metric L stored in the first column of memory locations 431 under the associated address an arithmetic unit 44 forms a new overall metric $L_0$ by adding the two values together, which overall metric is stored in the second column of memory locations 432 under the associated address. The result of the addition is applied to the data input D of the memory module 43. The associated read or write operations of the memory module 43 are controlled by the controller via the read/write input R/W of the memory module 43.

In an identical manner the binary value 1 is given to the first input parameter $c_0$ and the overall metrics $L_1$ obtained in this manner are stored in the third column of memory locations 433.

After the control circuit 40 has recalculated all the memory contents of the second and third memory location column 432, 433 by passing through all the address combinations, the smallest value is selected from the new overall metrics $L_0$ of the second register cells 432 and from the overall metrics $L_1$ of the third register cells 433 by means of arithmetic unit 44. These two values are subtracted from each other in arithmetic unit 44. As depicted hereinbefore, the sign of the difference provides the estimate $\hat{b}_{i-n}$ and the absolute amount of the difference provides the reliability coefficient $q(\hat{b}^{i-n})$ assigned to this estimate.

After the estimate has been determined, the overall metrics $L_1$, $L_0$ stored in the second and third memory location columns 432,433 are exchanged for the new states. For this purpose the controller first generates the addresses 000 and 001. The states 000 and 001 result in the state 000 due to a zero-transition as described hereinbefore. The contents of the memory locations in the second memory location column 432 under the addresses 000 and 001 exactly correspond to a zero transition from these two states to the state 000. The contents of these two addressed memory locations of the second memory location column 432 are therefore compared to each other in arithmetic unit 44 and the smaller of the two values is written as a new content under the address 000 in the first memory location column 431. The contents of the memory locations addressed under 000 and 001 of the third memory location column 433 correspond to a one-transition to the 100 state. The contents of these two addressed memory locations are therefore also compared to each other in the arithmetic unit and the smaller of the two values of the overall metrics stored in these register cells is stored as a new overall metric under the memory location corresponding to the address 100 of the first memory location column 431.

By accordingly driving and comparing the further memory locations, each new overall metric of a new state is determined and written under the address of the first memory location column allocated to the new state. Subsequently, the arrival of a new sample value $z_{i+1}$ is waited for and the associated estimate $\hat{b}_{i+1-n}$ is formed in above-described manner.

In each receive branch the numerical value $q_a$ or $q_b$ is determined separately and buffered each in its own storage section $RAM_a$ or $RAM_b$ respectively. Since the transmitted data are always combined to data blocks, each numerical value $q_a$ or $q_b$, may be assigned to a specific data element of such a data block. Data elements are simultaneously read out from the storage section $RAM_a$ or $RAM_b$ in pairs and added together in an adder 6 in accordance with their position in the data block. The result of the adder 6 is the estimate q which is the result of the addition of the two estimates $q_a$, and $q_b$ of the two receive branches A and B. As with the estimates $q_a$ and $q_b$ of the two receive branches, the sign also in this case denotes the data symbol $\hat{b}$ of the estimate q, and the absolute value of the estimate $\hat{q}$ denotes the reliability coefficient for these data symbols $\hat{b}$.

If there are more than two receive branches the adder 6 need only be provided with a corresponding number of inputs so that the numerical values available at the individual inputs are again added together to a single numerical value q.

I claim:

1. A receiver comprising at least two receive branches for receiving an incoming signal corresponding to a transmitted data sequence, each branch including a respective equalizer and detector for producing a respective signal corresponding to said transmitted data sequence, wherein said respective signals comprise respective sequences of one-bit data elements and are combined in accordance with their receive quality to provide an estimate of said transmitted data sequence, characterized in that each equalizer comprises means for producing a respective reliability information signal for each respective one-bit data element of the respective sequence of one-bit data elements, and said receiver comprises means for estimating values of said transmitted data sequence based on the respective reliability information signals respectively associated with each respective one-bit data element of the respective sequence of one-bit data elements produced in each branch.

2. A receiver comprising at least two receive branches for receiving an incoming signal corresponding to a transmitted data sequence, each branch including a respective equalizer and detector for producing a respective signal corresponding to said transmitted data sequence, wherein said transmitted data sequence is a sequence of elements, each element being a respective selected one of two data symbols, and said respective signals comprise respective sequences of one-bit data elements and are combined in accordance with their receive quality to provide an estimate of said transmitted data sequence, characterized in that each equalizer comprises means for producing a reliability information signal for each respective one-bit data element of the respective sequence of one-bit data elements, said receiver comprises means for estimating values of said transmitted data sequence based on the reliability information signal respectively associated with each respective one-bit data element of the respective sequence of one-bit data elements produced in each branch, and for each respective estimated element of said respective signal corresponding to said transmitted data sequence, each receive branch provides a single numerical value $q(b_i)$ whose sign represents the estimate of which data symbol was transmitted, and whose absolute value represents the reliability information signal assigned to said respective estimated data element.

3. A receiver comprising at least two receive branches for receiving an incoming signal corresponding to a transmitted data sequence, each branch including a respective equalizer and detector for producing a respective signal corresponding to said transmitted data sequence, wherein said transmitted data sequence is a sequence of elements, each element being a respective selected one of two data symbols, and said respective signals comprise respective sequences of one-bit data elements and are combined in accordance with their receive quality to provide an estimate of said transmitted data sequence, characterized in that each equalizer comprises means for producing a reliability information signal for each respective one-bit data element of the respective sequence of one-bit data elements, said receiver comprises means for estimating values of said transmitted data sequence based on the reliability information signal respectively associated with each respective one-bit data element of the respective sequence of one-bit data elements produced in each branch, and for each respective estimated element of said respective signal corresponding to said transmitted data sequence, each receive branch provides a single numerical value $q(b_i)$ whose sign represents the estimate of which data symbol was transmitted, and whose absolute value represents the reliability information signal assigned to said respective estimated data element, each value $q(b_i)$ approximately corresponding to $$q(b_i) = C(b_i) \cdot \ln \frac{1 - P(b_i)}{P(b_i)}$$

where P is a probability value corresponding to the respective reliability information of the data symbol ($b_i$), and $C(b_i)$ has either the value +1 or −1 according to the estimate of which data symbol was transmitted.

4. A receiver as claimed in claim 3, characterized in that the receiver adds the respective numerical values computed for each receive branch for one data element to select the data symbol which is the estimate for that one data element.

\* \* \* \* \*